United States Patent

[11] 3,557,381

[72] Inventor Donald E. Henry
Davenport, Iowa

[21] Appl. No. 812,489
[22] Filed Sept. 27, 1968
[45] Patented Jan. 19, 1971
[73] Assignee Gulf & Western Industries Inc.
New York, N.Y.
a corporation of Delaware. by mesne assignments

[54] ZERO SWITCHING CIRCUIT

6 Claims, 1 Drawing Fig.

[52] U.S. Cl. .......... 307/133, 317/11; 307/252
[51] Int. Cl. .......... H01h 9/56
[50] Field of Search .......... 307/133, 252; 317/11.1

[56] References Cited

UNITED STATES PATENTS

| | | | |
|---|---|---|---|
| 3,097,314 | 7/1963 | Harriman | 317/11.1UX |
| 3,335,291 | 8/1967 | Gutzwiller | 307/133UX |
| 3,402,302 | 9/1968 | Coburn | 307/133 |
| 3,443,204 | 5/1969 | Baker | 307/133UX |
| 3,450,891 | 6/1969 | Riley | 307/133 |
| 3,485,800 | 7/1969 | Bross | 307/133X |

*Primary Examiner*—Robert K. Schaefer
*Assistant Examiner*—T. B. Joike
*Attorney*—Meyer, Tilberry & Body

ABSTRACT: There is provided a signal synchronizing network for providing an output signal when the signal developed by an alternating voltage source is at a predetermined signal level comprising: a first electronic control means having an input circuit adapted to be coupled to the alternating voltage source, and an output circuit; a second electronic control means having a first, second, and control electrode, and exhibiting the characteristics of providing a low impedance to the flow of current between the first and second electrodes from a voltage source coupled across the first and second electrodes upon application of a first level signal to the control electrode, and maintaining the low impedance upon application of a second level signal to the control electrode until the voltage coupled across the first and second electrodes attains a given value; circuit means connected to the control electrode of the second electronic control means for coupling the control electrode to the output circuit of the first electronic control means; and, circuit means connected to the first electrode of the second electronic control means for providing an output signal when the value of the signal developed by the alternating voltage source attains a predetermined level.

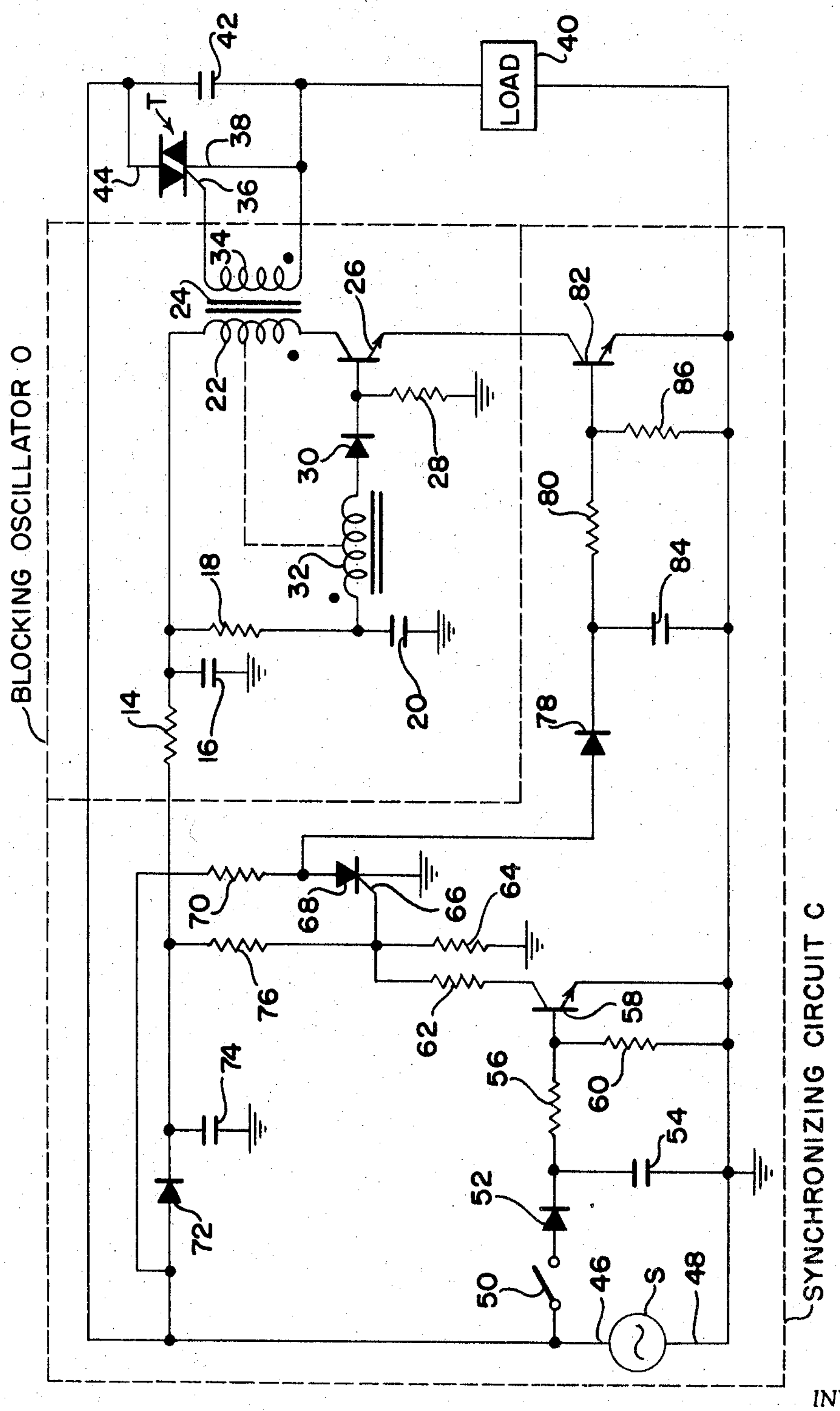
INVENTOR.
DONALD E. HENRY
BY
*Meyer, Tilberry & Body*
ATTORNEYS

ZERO SWITCHING CIRCUIT

The present invention relates to the art of circuits of the type for actuating a switching device, and, more particularly, to such circuits for gating an electronic device into conduction when the voltage of an alternating voltage supply source attains a predetermined level.

The present invention is particularly applicable as a control circuit for a triac, and will be described with particular reference thereto, although it will be appreciated that the invention has broader application and may be used with silicon controlled rectifiers or other similar switching devices.

Solid-state switching devices, which are triggered into conduction by a gating signal, for controlling the voltage applied to a load have become an important component in a wide variety of control applications. One such device is a silicon controlled rectifier. These devices are limited to use in permitting current conduction in one direction only; therefore, for alternating current applications it is necessary to employ two silicon controlled rectifiers, poled in reverse directions with the gates of each device separately triggered. More recently, a device known as a triac and described in Application Note 200.35, March, 1966 by General Electric Company, has been employed for controlling the flow of alternating current. The term triac is a generic term that has been given a three-electrode AC semiconductor switch.

One problem encountered in switching a load, particularly an inductive load, across an alternating-voltage supply source with a device such as a triac, is that the transient voltage developed when the voltage is switch frequently exceeds the maximum voltage rating of the device, thereby often destroying the device.

Further, in the operation of a switching device for switching an alternating-voltage supply source across a load, it is often desirable to gate the device into conduction at a predetermined period of time after the commencement of a cycle of the alternating-voltage signal.

The present invention contemplates a new and improved circuit for controlling a switching device which overcomes all of the above referred-to problems, and others, and provides a circuit which is simple in construction.

In accordance with the present invention there is provided a signal synchronizing network for providing an output signal when the signal developed by an alternating-voltage supply source is at a predetermined level comprising: a first electronic control means having an input circuit adapted to be coupled to the alternating-voltage source, and an output circuit; a second electronic control means having a first, second, and control electrode, and exhibiting the characteristics of providing a low impedance to the flow of current between the first and second electrodes from a voltage source coupled across the first and second electrodes upon application of a first level signal to the control electrode, and maintaining the low impedance upon application of a second level signal to the control electrode until the voltage coupled across the first and second electrodes attains a given value; circuit means connected to the control electrode of the second electronic control means for coupling the control electrode to the output circuit of the first electronic control means; and, circuit means connected to the first electrode of the second electronic control means for providing an output signal when the value of the signal developed by the alternating-voltage source attains a predetermined level.

In accordance with another aspect of the present invention, there is provided a switching circuit for switching an alternating voltage source across a load comprising: switch means having a first, second, and control electrode, and exhibiting the characteristic of presenting a low impedance to current flow from the voltage source to the load when a forward biasing signal is applied to the control electrode; circuit means for applying a forward biasing signal to the control electrode including: a transformer having a primary and a secondary winding wherein the secondary winding is connected between the first and control electrodes; first circuit means for developing a signal from the alternating voltage source; first and second actuatable switching means for, when both are actuated, completing a circuit between the primary winding and the circuit means for developing a signal for energizing the primary winding means for periodically, and at a given frequency, actuating the first actuatable switching means; and means for monitoring the voltage developed by the alternating voltage source and actuating the second switching means. The monitoring means includes an electronic control means having a first, second, and control electrode, and exhibiting the characteristics of providing a low impedance to the flow of current between the first and second electrodes from a voltage source coupled across the first and second electrodes upon application of a first level signal to the control electrode, and maintaining the low impedance upon application of a second level signal to the control electrode until the voltage coupled across the first and second electrodes attains a given value; second circuit means connected to the control electrode of the electronic control means adapted to couple the control means to the alternating voltage source; and, third circuit means connected to the first electrode of the electronic control means for connecting the electronic control means to the second actuatable switching means so that the switching means is actuated when the alternating voltage attains a predetermined voltage level.

The principle object of the present invention is to provide a circuit for actuating a switching device to thereby switch an alternating voltage source across a load at a time when the voltage developed by an alternating-voltage supply source is at approximately a zero-voltage level.

Another object of the present invention is to provide a circuit for actuating a switching device wherein switching is synchronized with the alternating-voltage cycle developed by an alternating-voltage supply source.

Another object of the present invention is to provide a semiconductive switching circuit which is capable of operation at relatively high temperatures, i.e., in excess of 100° C.

A still further object of the present invention is to provide a control circuit for actuating a switching device in which the gating signal takes the form of a short time-duration pulse and is applied to the device at a time when the alternating voltage developed by an alternating-voltage supply source is at approximately a zero-voltage level.

A still further object of the present invention is to provide a circuit for actuating a switching device at a predetermined time after commencement of a voltage cycle of an alternating-voltage supply source.

A further object of the present invention is to provide an improved circuit for gating a triac into conduction.

These and other objects and advantages of the invention will become apparent from the following description of the preferred embodiment of the invention when read in conjunction with the accompanying drawing in which:

The FIG. is a schematic circuit diagram illustrating an electronic control circuit for gating a triac into conduction in accordance with the preferred embodiment of the present invention.

Reference is now made to the drawing, wherein the showings are for purposes of illustrating a preferred embodiment of the present invention and not for purposes of limiting same, the FIG. illustrates a control circuit for gating a triac, and generally comprises an alternating-voltage supply source S connected to a synchronizing circuit C which is connected through a blocking oscillator circuit O to the control electrode of a triac T.

BLOCKING OSCILLATOR

Blocking oscillator circuit O, as is more particularly described in U.S. Pat. application, Ser. No. 730,212, filed April 16, 1968, and entitled "High Temperature Semiconductor Switching Circuit," includes a resistor 14 having one terminal connected to synchronizing circuit C and the other terminal connected through a capacitor 16 to ground. Connected to the junction between resistor 14 and capacitor 16 is one terminal of a resistor 18 having the other terminal thereof connected through a capacitor 20 to ground. Also connected to the junction between resistor 14 and capacitor 16 is one terminal of a primary winding 22 of a transformer 24. Connected to the other terminal, or the positive-polarity indicated end, or primary winding 22 is the collector of an NPN transistor 26 having its base connected through a resistor 28 to ground. Also connected to the base of transistor 26 is the cathode of a diode 30 having its anode connected to one terminal of a feedback winding 32 of transformer 24. The other terminal, or the positive-polarity indicated end, of feedback winding 32 is connected directly to the junction between resistor 18 and capacitor 20. The emitter of transistor 26 is connected to the other output terminal of synchronizing circuit C. One terminal of a secondary winding 34 of transformer 24 is connected to the control electrode 36, or gate terminal of triac T, and the other terminal, or positive-polarity indicated end, of secondary winding 34 is connected directly to a first terminal 38 of triac T. The first terminal 38 of triac T is connected through a load 40 to ground, and through a capacitor 42 to a second terminal 44 of triac T. Terminal 44 of triac T is also connected directly to one terminal 46 of alternating-voltage supply source S.

SYNCHRONIZING CIRCUIT

Synchronizing circuit C includes voltage source S having a terminal 48 connected directly to ground, and the other terminal 46 connected through a normally-open switch 50 to the anode of a diode 52. The cathode of diode 52 is connected through a capacitor 54 to ground, and is also connected through a resistor 56 to the base of an NPN transistor 58. The base of transistor 58 is also connected through a resistor 60 to ground, and the emitter of this transistor is connected directly to ground.

The collector of transistor 58 is connected through a pair of series-connected resistors 62 and 64 to ground, and the junction between these resistors is connected to the control terminal 66 of an electronic control device 68. The electronic control device 68 preferably is a silicon controlled rectifier, however, as is readily apparent other electronic control devices with similar operating characteristics could be substituted therefor. The anode of silicon controlled rectifier 68 is connected through a resistor 70 to terminal 46 of alternating-voltage supply source S, and the cathode of the controlled rectifier 68 is connected directly to ground.

Terminal 46 of alternating-voltage source S is also connected to the anode of a diode 72, having its cathode connected through a capacitor 74 to ground. The cathode of diode 72 is connected through a resistor 76 to the control electrode of silicon controlled rectifier 68. The cathode of diode 72 also provides an output terminal for synchronizing circuit C which is connected to resistor 14.

The anode of silicon controlled rectifier 68 is coupled through the series-connected diode 78, poled as shown in the FIG., and resistor 80, to the base of an NPN transistor 82. Connected between the junction of diode 78 and resistor 80 is one terminal of capacitor 84, having the other terminal thereof connected to ground. The base of transistor 82 is also connected through a resistor 86 to ground, and the emitter of this transistor is connected directly to ground. The collector of transistor 82 provides the other output terminal of synchronizing circuit C and is coupled directly to the emitter of transistor 26.

OPERATION OF BLOCKING OSCILLATING CIRCUIT

Blocking oscillator circuit O is made operative once transistor 82 is gated into conduction by synchronizing circuit C. This places the emitter of transistor 26 at substantially ground potential so as to pass current once this transistor is forward biased. Diode 72 serves as a rectifier to charge capacitor 16 during the positive half cycle of alternating current voltage source S. Capacitor 16, in turn, serves as a direct current voltage source for oscillator O. Resistor 14 serves as a current limiting resistor to reduce the voltage applied to the oscillator circuit. As current passes through resistors 14 and 18, winding 32, diode 30 and resistor 28, a forward biasing potential is applied to the base of transistor 26. Since transistor 82 has been gated into conduction by circuit C, current will now flow from diode 72, through resistor 14, winding 22, the collector to emitter electrodes of transistor 26, and through the collector to emitter electrodes of transistor 82. As current flows through winding 22 a forward biasing potential is reflected onto the base of transistor 26 through winding 32. As this is a regenerative type oscillating circuit, the more current that passes through winding 22 the greater will be the forward biasing potential applied to the base of transistor 26. This regenerative action continues until the core of transformer 24 saturates, at which time any further increase in current flowing through winding 22 will not increase the forward bias applied to the base of transistor 26. As this happens, the oscillator circuit will begin to collapse, because there will appear to be a reverse bias potential applied by winding 32 to the base of transistor 26. This, in turn, reduces the amount of current flowing in winding 22 to increase the reverse biasing potential applied to the base of transistor 26. This operation of increasing and decreasing the amount of current flowing through winding 22 continues at a frequency dictated by the core material of the transformer 24. During this oscillating operation, capacitor 20 serves as a filter connected to resistor 18 and winding 32 to hold a bias level voltage for transistor 26. The output of the transformer is taken from winding 34 which applies positive and negative going gating pulses at the oscillator frequency to gate 36 at triac T.

When transistor 82 is reverse biased, the oscillator circuit including transistor 26 will cease to oscillate since there will be no path for the discharge of capacitor 20. Transistor 82 is actuated by the signal supplied from synchronizing circuit C.

OPERATION OF SYNCHRONIZING CIRCUIT

Prior to the closure of normally-open switch 50, transistor 58 is reverse biased to thereby cause a binary "1" signal to be applied to the control electrode 66, or gate, of silicon controlled rectifier 68. By a binary "1" signal is meant a signal of some positive potential, and by a binary "0" signal is meant a signal equal to approximately zero potential, or a slightly negative potential. Upon application of a binary "1" signal to the control electrode of silicon controlled rectifier 68, the controlled rectifier will present a low impedance to the flow of current supplied by alternating-voltage source supply S during the positive portion of each cycle. Because of the low impedance exhibited by silicon controlled rectifier 68 with respect to the positive polarity-signal, a binary "0" signal will be applied through diode 78 to the base of transistor 82. Diode 78 will effectively prevent the negative polarity portion of the signal developed by the source S from being applied to the base of transistor 82. When a binary "0" signal is applied to the base of transistor 82, the transistor will become reverse biased to thereby prevent blocking oscillator circuit O from oscillating.

Upon closure of normally-open switch 50, the alternating-voltage signal developed by source S is rectified through diode 52 and capacitor 54 to apply a binary "1" signal to the base of transistor 58 thereby forward biasing this transistor into conduction. When transistor 58 becomes conductive, a binary "0" signal will be applied to the control electrode 66 of silicon controlled rectifier 68. The silicon controlled rectifier 68 will continue to exhibit a low impedance to the positive polarity current flow until the voltage applied to the anode becomes slightly negative with respect to the cathode. Thus, as the signal developed by source S becomes slightly negative, silicon controlled rectifier 68 exhibits a high impedance to the flow of current. When the signal developed by source S again becomes slightly positive, a binary "1" signal will be applied through diode 78 to forward bias transistor 82 into conduction. As may be readily apparent, transistor 82 will be forward biased into conduction on the leading edge of the positive-polarity portion of the alternating-voltage signal developed by source S. By varying the bias signal applied to transistor 82, i.e., altering the value of resistor 86, the positive voltage level at which transistor 82 is forward biased may be varied from approximately zero volts to approximately the maximum positive polarity signal developed by source S. In order to actuate triac T into conduction at a point in time when the alternating voltage signal applied to the terminals is approximately a zero voltage level, it would be necessary to bias transistor 82 such that the transistor becomes conductive when the signal developed by source S becomes slightly positive. Alternatively, the bias signal applied to transistor 58 could be varied by altering the impedance of resistor 60 to obtain similar results.

Although the invention has been shown in connection with a preferred embodiment, it will be readily apparent to those skilled in the art that various changes in form, such as replacement of NPN transistor 58 with a PNP transistor in order to provide synchronization with negative polarity portion of the alternating voltage signal developed by supply source S, may be made without departing from the spirit and scope of the invention as defined by the appended claims.

I claim:

1. A switching circuit for switching an alternating voltage source across a load comprising:

static switch means having a first, second, and control electrode, said switch means exhibiting the characteristic of presenting a low impedance to current flow from said alternating voltage source to said load when a forward biasing signal is applied to said control electrode;

circuit means for applying a forward biasing signal to said control electrode including:

first circuit means for developing a signal from a said alternating-voltage source;

first and second actuable switching means coupled to said first circuit means for, when both are actuated, applying a said forward biasing signal to said control electrode of said static switch means;

means for periodically, and at a given frequency, actuating said first actuable switching means; and means for monitoring the level voltage developed by a said alternating voltage source and actuating said second switching means, said monitoring means including: an electronic control means having a first, second, and control electrode, and exhibiting the characteristics of providing a low impedance to the flow of current between said first and said second electrodes from a said voltage source coupled across said first and second electrodes upon application of a first level signal to said control electrode and maintaining a said low impedance upon application of a second level signal to said control electrode until said voltage coupled across said first and second electrodes attains a given value; second circuit means connected to said control electrode of said electronic control means and adapted to couple said control means to a said alternating voltage source for providing a signal to said control electrode of said control means when the signal developed by a said alternating voltage source attains said predetermined value; and, third circuit means connected to said first electrode of said electronic control means for connecting said control means to said second actuable switching means so that said second switching means is actuated when a said alternating voltage attains a predetermined voltage level.

2. A switching circuit as defined in claim 1 wherein said static switch means is a triac having first and second electrodes adapted to be connected in series with an alternating voltage source and a load; and, said third circuit means includes a diode coupled between said first electrode of said electronic control means and said second actuatable switching means.

3. A switching circuit as defined in claim 2 wherein said means for periodically actuating said first actuable switching means includes a transformer having a primary and a secondary winding, said secondary winding connected between said first and second control electrodes of said switch means; and, said first and said second actuable switching means coupled between said first circuit means and said primary winding of said transformer, for, when both are actuated, completing a circuit between said primary winding and said first circuit means; and, said second circuit means includes a second electronic control means having a first, second, and control electrode, said first electrode being coupled to said control electrode of said first electronic control means and said control electrode of said second electronic control means adapted to be coupled across said voltage source.

4. A switching circuit as defined in claim 3 wherein said transformer includes a feedback winding coupled between said first circuit means and said first actuatable switching means; and said second circuit means includes a switch means coupled to said control electrode of said second electronic control means and adapted to be connected to said voltage source.

5. A triac switching circuit for switching an alternating voltage source across a load, a signal synchronizing network for providing an output signal when the signal developed by a said alternating voltage source attains a predetermined level comprising:

a first electronic control means having an input circuit adapted to be coupled to a said alternating voltage source, and an output circuit means for providing an output signal when said signal reaches a predetermined level;

a second electronic control means having a first, second, and control electrode, and exhibiting the characteristics of providing a low impedance to the flow of current between said first and said second electrodes from a said voltage source coupled across said first and second electrodes upon application of a first level signal to said control electrode and maintaining a said low impedance upon application of a second level signal to said control electrode until said voltage coupled across said first and second electrodes attains a given value;

first circuit means connected to said control electrode of said second electronic control means for coupling said second control means to said output circuit of said first electronic control means;

first actuable switching means having a first, second and control electrode;

means coupled to said control electrode of said actuatable switching means for periodically, and at a given frequency, actuating said first actuatable switching means; and said second circuit means includes a second actuatable switching means; said first and said second actuable switching means for, when both are actuated, providing an output signal.

6. A triac switching circuit as defined in claim 5 including a third circuit means adapted to be coupled to a said alternating voltage source for providing a signal; and, said means for periodically actuating said first actuatable switching means includes a transformer having a primary and a secondary winding, said primary winding coupled between said third circuit means and said first actuatable switching means, and said secondary winding adapted to be coupled to a said triac; and, said second circuit means includes a third electronic control means having a first, second, and control electrode; and, a diode coupled between said first electrode of said second electronic control means and said control electrode of said third electronic control means, said first and second electrodes of said third electronic control means carrying a said output signal when the value of the signal developed by a said alternating voltage source attains a predetermined level.